United States Patent
Zhu et al.

(10) Patent No.: US 10,966,442 B2
(45) Date of Patent: Apr. 6, 2021

(54) REFRIGERATOR

(71) Applicant: QINGDAO HAIER JOINT STOCK CO., LTD., Qingdao (CN)

(72) Inventors: Xiaobing Zhu, Qingdao (CN); Haoquan Liu, Qingdao (CN); Bo Jiang, Qingdao (CN); Liyan Wang, Qingdao (CN)

(73) Assignee: QINGDAO HAIER JOINT STOCK CO., LTD., Qingdao (CN)

(*) Notice: Subject to any disclaimer, the term of this patent is extended or adjusted under 35 U.S.C. 154(b) by 262 days.

(21) Appl. No.: 16/099,685

(22) PCT Filed: Feb. 23, 2017

(86) PCT No.: PCT/CN2017/074603
§ 371 (c)(1),
(2) Date: Nov. 7, 2018

(87) PCT Pub. No.: WO2017/206556
PCT Pub. Date: Dec. 7, 2017

(65) Prior Publication Data
US 2019/0150484 A1    May 23, 2019

(30) Foreign Application Priority Data
May 31, 2016 (CN) .......................... 201610378927.8

(51) Int. Cl.
*F25B 25/02* (2006.01)
*A23L 3/3436* (2006.01)
(Continued)

(52) U.S. Cl.
CPC ............ *A23L 3/3436* (2013.01); *A23L 3/3427* (2013.01); *A23L 3/34095* (2013.01); *A23L 3/36* (2013.01);
(Continued)

(58) Field of Classification Search
CPC ........ F25B 25/02; F25D 11/02; F25D 17/045; F25D 17/042; B01D 53/0446; B01D 53/228; A23L 3/3427; A23L 3/3418
(Continued)

(56) References Cited

U.S. PATENT DOCUMENTS 5,623,105 A * 4/1997 Liston .................. A23L 3/3418
422/3
2008/0017045 A1* 1/2008 McGuire .............. B67D 1/0406
99/323
(Continued)

FOREIGN PATENT DOCUMENTS

CN         2525449 Y    12/2002
CN      101000191 A     7/2007
(Continued)

*Primary Examiner* — Reginald Alexander
(74) *Attorney, Agent, or Firm* — Cheng-Ju Chiang

(57) ABSTRACT

The present invention provides a refrigerator, comprising: an adsorption container, an air compressor and a nitrogen storage tank. A sealed storage space is formed in a storage compartment of the refrigerator. The adsorption container with carbon molecular sieves disposed therein is disposed in the storage compartment. The air compressor is directly connected to the adsorption container through an air inlet pipe and configured to supply compressed air for the adsorption container in a controlled manner so as to allow the carbon molecular sieves to prepare nitrogen by means of the compressed air. A gas inlet end of the nitrogen storage tank is connected to the adsorption container, and a gas outlet end thereof is communicated with the storage space.

9 Claims, 6 Drawing Sheets

(51) Int. Cl.
- *F25D 17/04* (2006.01)
- *B01D 53/047* (2006.01)
- *C01B 21/04* (2006.01)
- *A23L 3/3427* (2006.01)
- *B01D 53/04* (2006.01)
- *A23L 3/3409* (2006.01)
- *A23L 3/36* (2006.01)
- *B01D 53/053* (2006.01)

(52) U.S. Cl.
CPC ....... *B01D 53/047* (2013.01); *B01D 53/0446* (2013.01); *B01D 53/053* (2013.01); *C01B 21/0461* (2013.01); *F25B 25/02* (2013.01); *F25D 17/042* (2013.01); *A23V 2002/00* (2013.01); *B01D 2253/102* (2013.01); *B01D 2253/116* (2013.01); *B01D 2256/10* (2013.01); *B01D 2257/104* (2013.01); *B01D 2258/06* (2013.01); *F25D 2317/041* (2013.01); *F25D 2317/061* (2013.01)

(58) Field of Classification Search
USPC .............................. 99/467, 473; 62/440, 531
See application file for complete search history.

(56) References Cited

U.S. PATENT DOCUMENTS

2014/0102119 A1    4/2014  Burger et al.
2016/0366919 A1*  12/2016  van Someren Greve .................... A23L 3/3418

FOREIGN PATENT DOCUMENTS

| | | | |
|---|---|---|---|
| CN | 101726146 | A | 6/2010 |
| CN | 102372263 | A | 3/2012 |
| CN | 204214187 | U | 3/2015 |
| CN | 106091519 | A | 11/2016 |
| JP | 2000-337758 | A | 12/2000 |
| KR | 20040083548 | A  * | 10/2004 |
| WO | 2012/091374 | A2 | 7/2012 |

* cited by examiner

REFRIGERATOR

CROSS REFERENCE TO RELATED APPLICATIONS

The present application is a 35 U.S.C. § 371 National Phase conversion of International (PCT) Patent Application No. PCT/CN2017/074603, filed on Feb. 23, 2017, which further claims benefit of Chinese Patent Application No. 201610378927.8, filed on May 31, 2016, the disclosure of which is incorporated by reference herein. The PCT International Patent Application was filed and published in Chinese.

TECHNICAL FIELD

The present invention relates to a refrigerating and freezing device, in particular to a refrigerator.

BACKGROUND

Currently, freshness preservation is to ensure the quality of food or other articles as long as possible. In general, reduction in quality of fruits and vegetables is predominantly related to their own aerobic respiration and reproduction of microorganisms in food. Therefore, freshness preservation of fruits and vegetables requires reduction of their own aerobic respiration and reduction in bioactivity of the microorganisms.

Freshness preservation means commonly used in a storage device of a freshness preservation refrigerator (refrigerating cabinet) mainly includes: low-temperature treatment. However, this means cannot effectively inhibit the aerobic respiration of fruits and vegetables or growth of the microorganisms. Besides, an excessively low temperature will lead to nutrient loss of food. Therefore, a conventional refrigerator is short in freshness preservation time and cannot meet the demand for long-term storage of food, and the freshness preservation performance thereof cannot satisfy users' requirements.

SUMMARY

In view of the above-mentioned problem, there is provided a refrigerator to conveniently solve the whole or at least part of the problem.

A further objective of the present invention is to improve the freshness preservation performance of the refrigerator.

Another objective of the present invention is to make the structure of the refrigerator compact and to save the use space of the refrigerator.

According to an aspect of the present invention, there is provided a refrigerator, comprising: a refrigerator body, an adsorption container, an air compressor and a nitrogen storage tank. A storage compartment is defined in the refrigerator body. A sealed storage space is formed in the storage compartment. The adsorption container with carbon molecular sieves disposed therein is disposed in the storage compartment. The air compressor is directly connected to the adsorption container through an air inlet pipe and configured to supply compressed air for the adsorption container in a controlled manner so as to allow the carbon molecular sieves to prepare nitrogen by means of the compressed air. The nitrogen storage tank is adjacent to the adsorption container. A gas inlet end of the nitrogen storage tank is connected to the adsorption container to receive nitrogen prepared by the carbon molecular sieves, and a gas outlet end thereof is communicated with the storage space to provide the prepared nitrogen.

Alternatively, the air compressor is disposed in the storage compartment and adjacent to the adsorption container and configured to suck air from the interior of the storage compartment, and to compress the sucked air to supply the compressed air for the adsorption container.

Alternatively, the refrigerator further comprises a nitrogen generation box disposed in the storage compartment and clung to an inner wall of the refrigerator body. An accommodating cavity is defined in the nitrogen generation box to accommodate the adsorption container, the air compressor and the nitrogen storage tank.

Alternatively, the air compressor is disposed in a compressor room of the refrigerator and configured to suck air from the interior of the compressor room, and to compress the sucked air to supply the compressed air for the adsorption container.

Alternatively, at least part of the air inlet pipe extends along an air passage of the refrigerator and leads to the adsorption container.

Alternatively, the refrigerator further comprises a partition plate disposed in the refrigerator body to divide the storage compartment. The adsorption container clings to a corner formed by the inner wall of the refrigerator body and the partition plate.

Alternatively, the air compressor is configured to be started at intervals during preparation of nitrogen to provide the compressed air for the adsorption container. The adsorption container is further configured to be communicated with an external environment of the adsorption container at a pause time of the air compressor to discharge an oxygen-enriched gas desorbed by the carbon molecular sieves to the external environment.

Alternatively, the refrigerator further comprises a three-way solenoid valve disposed on the air inlet pipe and provided with three gas delivery ports. A first gas delivery port is communicated with the air compressor. A second gas delivery port is communicated with the adsorption container. A third gas delivery port is communicated with the external environment. The three-way solenoid valve is configured to communicate the first gas delivery port with the second gas delivery port so as to allow the air compressor to supply the compressed air for the adsorption container, and is further configured to close the first gas delivery port and to communicate the second gas delivery port with the third gas delivery port at the pause time of the air compressor so as to discharge the oxygen-enriched gas desorbed by the adsorption container to the external environment through the third gas delivery port.

Alternatively, the refrigerator further comprises a two-way solenoid valve disposed on a connecting pipeline between the adsorption container and the nitrogen storage tank and configured to disconnect the connecting pipeline between the adsorption container and the nitrogen storage tank at the pause time of the air compressor to prevent nitrogen from backflow.

Alternatively, the refrigerator further comprises a flow regulation valve disposed on a pipeline, leading to the storage space, of the nitrogen storage tank and configured to regulate gas output flow of the nitrogen storage tank.

The present invention provides the refrigerator, which comprises the adsorption container, the air compressor and the nitrogen storage tank. The sealed storage space is formed in the storage compartment of the refrigerator. The adsorption container with the carbon molecular sieves disposed therein is disposed in the storage compartment. The air compressor is directly connected to the adsorption container through the air inlet pipe and configured to supply compressed air for the adsorption container in a controlled manner so as to allow the carbon molecular sieves to prepare nitrogen by means of the compressed air. The nitrogen storage tank is adjacent to the adsorption container. The gas inlet end of the nitrogen storage tank is connected to the adsorption container to receive nitrogen prepared by the carbon molecular sieves, and the gas outlet end thereof is communicated with the storage space to provide the nitrogen. According to the refrigerator, as the storage space for keeping food fresh is disposed in the storage compartment, the adsorption container is configured to prepare the nitrogen, and the nitrogen storage tank supplies the prepared nitrogen for the storage space. Thus, the content of oxygen in the storage space is reduced and the freshness preservation performance of the refrigerator is improved.

According to the refrigerator, through a miniaturization design of a nitrogen preparation system, at least the adsorption container and the nitrogen storage tank are placed in the storage compartment, facilitating the supply of nitrogen for the storage space. In addition, as the nitrogen storage tank is adjacent to the adsorption container, the refrigerator has a compact internal structure, and the use space of the refrigerator is saved.

Further, the air compressor is disposed in the storage compartment and adjacent to the adsorption container; the air compressor sucks air from the interior of the storage compartment, compresses the sucked air and supplies the compressed air for the adsorption container. As the air compressor and the adsorption container are disposed in the storage compartment, the structure of the refrigerator is compact and the use space thereof is saved. In addition, the air compressor directly sucks air from the interior of the storage compartment and compresses the sucked air. Since the temperature of the sucked air is relatively low, the temperature of the generated nitrogen is also relatively low. Thus, the temperature inside the storage space may not fluctuate greatly when the nitrogen is input into the storage space, facilitating freshness preservation of food.

Through the following detailed description of the specific embodiments of the present invention with reference to the drawings, those skilled in the art will understand the above and other objectives, advantages and features of the present invention more clearly.

BRIEF DESCRIPTION OF THE DRAWINGS

The followings will describe some specific embodiments of the present invention in detail in an exemplary rather than restrictive manner with reference to the accompanying drawings. The same reference signs in the drawings represent the same or similar parts. Those skilled in the art shall understand that these drawings may not be necessarily drawn according to the scales. In the drawings.

DETAILED DESCRIPTION

Figure 1:
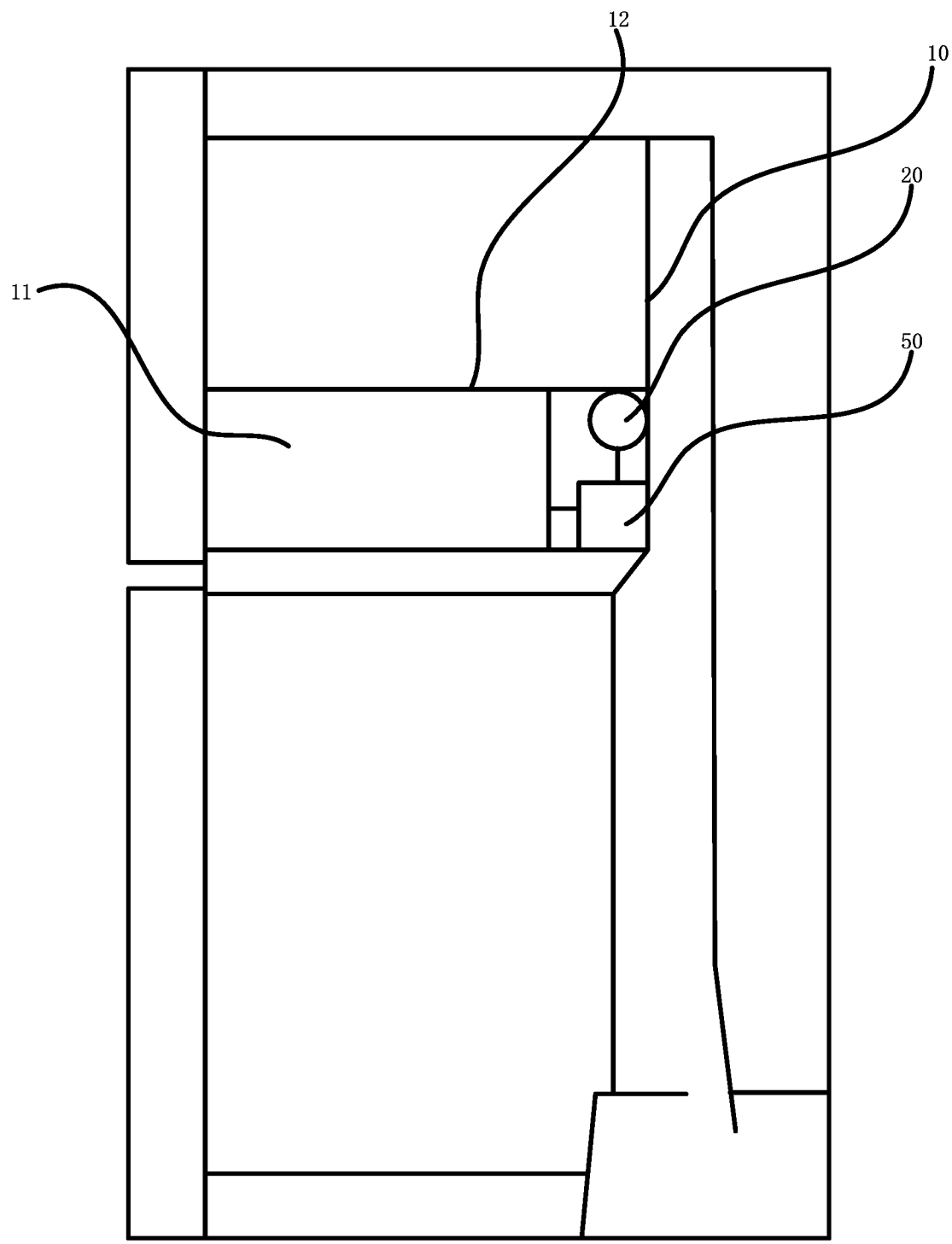
FIG. 1 is a schematic view of a refrigerator according to one embodiment of the present invention.

An embodiment provides a refrigerator first. FIG. 1 is a schematic view of a refrigerator according to one embodiment of the present invention. The refrigerator comprises a refrigerator body 10, an adsorption container 20, an air compressor 30 and a nitrogen storage tank 50.

A storage compartment is defined in the refrigerator body 10 of the refrigerator. A sealed storage space 11 is formed in the storage compartment and configured to store food which needs to be kept fresh for a long time, such as vegetables and fruits. The adsorption container 20 with carbon molecular sieves disposed therein is disposed in the storage compartment. The air compressor 30 is directly connected to the adsorption container 20 through an air inlet pipe 40 and configured to supply compressed air for the adsorption container 20 in a controlled manner so as to allow the carbon molecular sieves to prepare nitrogen by means of the compressed air. The nitrogen storage tank 50 is adjacent to the adsorption container 20. A gas inlet end of the nitrogen storage tank 50 is connected to the adsorption container 20 to receive nitrogen prepared by the carbon molecular sieves, and a gas outlet end thereof is communicated with the storage space 11 to provide the nitrogen.

The refrigerator provided by the embodiment utilizes a PSA (Pressure Swing Adsorption) nitrogen generation method to remove oxygen in the air so as to generate pure nitrogen. Then, the pure nitrogen is injected into the storage space 11 to keep food fresh. PSA is a main technique for gas generation at present, and particularly means that a mixed gas is pressurized at a constant temperature, an adsorbent is utilized to adsorb redundant impure gases to obtain a relatively pure gas, and the impure gases in the adsorbent are desorbed by a decompression (vacuumizing) or atmospheric pressure method, such that the adsorbent may be reused. The carbon molecular sieve is a common adsorbent for realizing oxygen-nitrogen separation and separating nitrogen from air at present. In the condition of the same adsorption pressure, the carbon molecular sieves adsorb much more oxygen than nitrogen. By use of this principle, the PSA nitrogen generation method uses air as a raw material, employs a PSA technique, and utilizes the preferential adsorption of the carbon molecular sieves to separate nitrogen from oxygen in air, thus generating pure nitrogen. A traditional PSA nitrogen generation device is mostly used for large-scale nitrogen generation, including an air tank and an oil-water separator, an air compressor 30 having a high working pressure, consequently, which is large in size and complicated in structure, and may not meet a nitrogen generation demand of the refrigerator.

In this embodiment, the air compressor has the working pressure of only 1.5-2 times of the atmospheric pressure, which is far lower than that of a large-scale nitrogen generation device. Owing to the low working pressure, the air tank for buffering in the large-scale nitrogen generation device is removed, so that the structure of the refrigerator is simplified. In addition, the oil-water separator for air purification in the large-scale nitrogen generation device is also removed. Besides, an air drying agent is disposed at the front end of the carbon molecular sieves to replace the oil-water separator for air purification. In addition, compared with the large-scale nitrogen generation device, the adsorption container 20 and the nitrogen storage tank 50 in the embodiment are miniaturized and preferably made of plastics. Thus, the adsorption container 20 and the nitrogen storage tank 50 are effectively reduced in size and weight, and therefore, may be applied to the interior of the refrigerator.

According to the refrigerator provided by the embodiment, through a miniaturization design of a nitrogen preparation system, preparation of nitrogen is applied to the interior of the refrigerator. At least the adsorption container 20 and the nitrogen storage tank 50 are placed in the storage compartment, facilitating supply of nitrogen for the storage space 11. In addition, as the nitrogen storage tank 50 is adjacent to the adsorption container 20, the refrigerator has a compact internal structure, and the use space of the refrigerator is saved.

Figure 2:
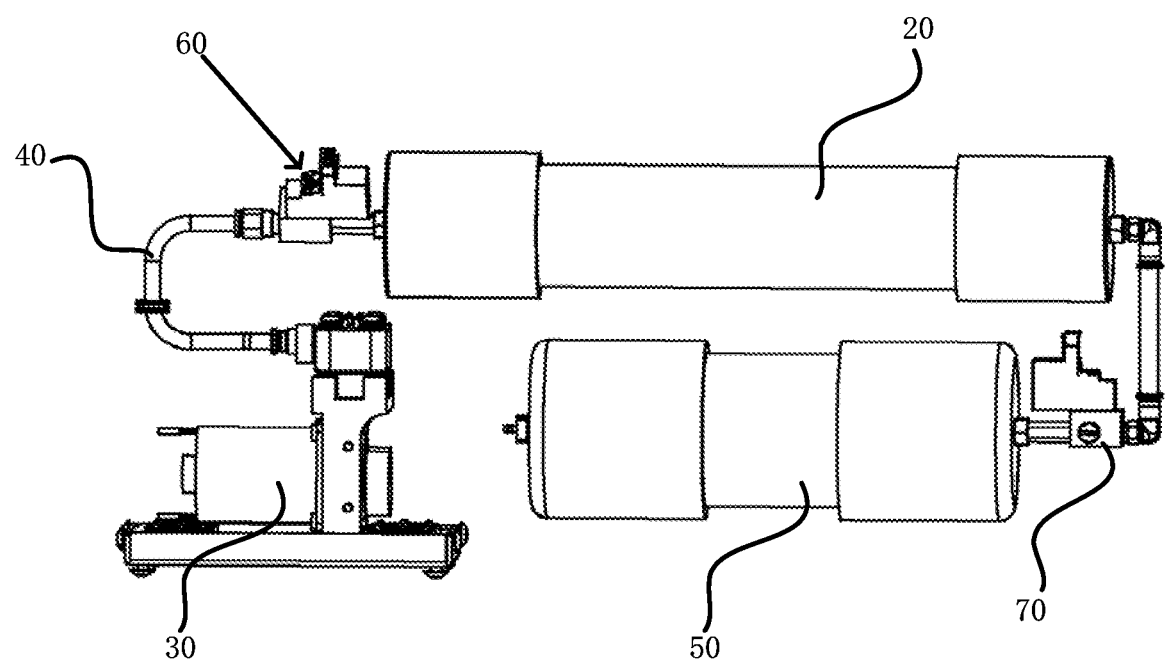
FIG. 2 is a schematic view of the interior of a storage compartment of a refrigerator according to one embodiment of the present invention.

FIG. 2 is a schematic view of the interior of a storage compartment of a refrigerator according to one embodiment of the present invention. The air compressor 30 is disposed in the storage compartment and adjacent to the adsorption container 20; the air compressor 30 is configured to suck air from the interior of the storage compartment and to compress the sucked air to supply the compressed air for the adsorption container 20. In the embodiment, the storage space 11 is preferably a refrigerating chamber of the refrigerator and is disposed in the refrigerating chamber. The adsorption container 20, the air compressor 30 and the nitrogen storage tank 50 are disposed in the refrigerating chamber and preferably behind the storage space 11. Thus, the overall structure of the refrigerator is compact. The use space of the refrigerator is saved. Nitrogen may be conveniently conveyed to the storage space 11. The air compressor 30 sucks air from the storage compartment and compresses the sucked air. Since the temperature of the sucked air is relatively low, the temperature of the generated nitrogen is also relatively low. Thus, the temperature inside the storage space 11 may not fluctuate greatly when the nitrogen is input into the storage space 11, contributing to freshness preservation of food.

Figure 3:
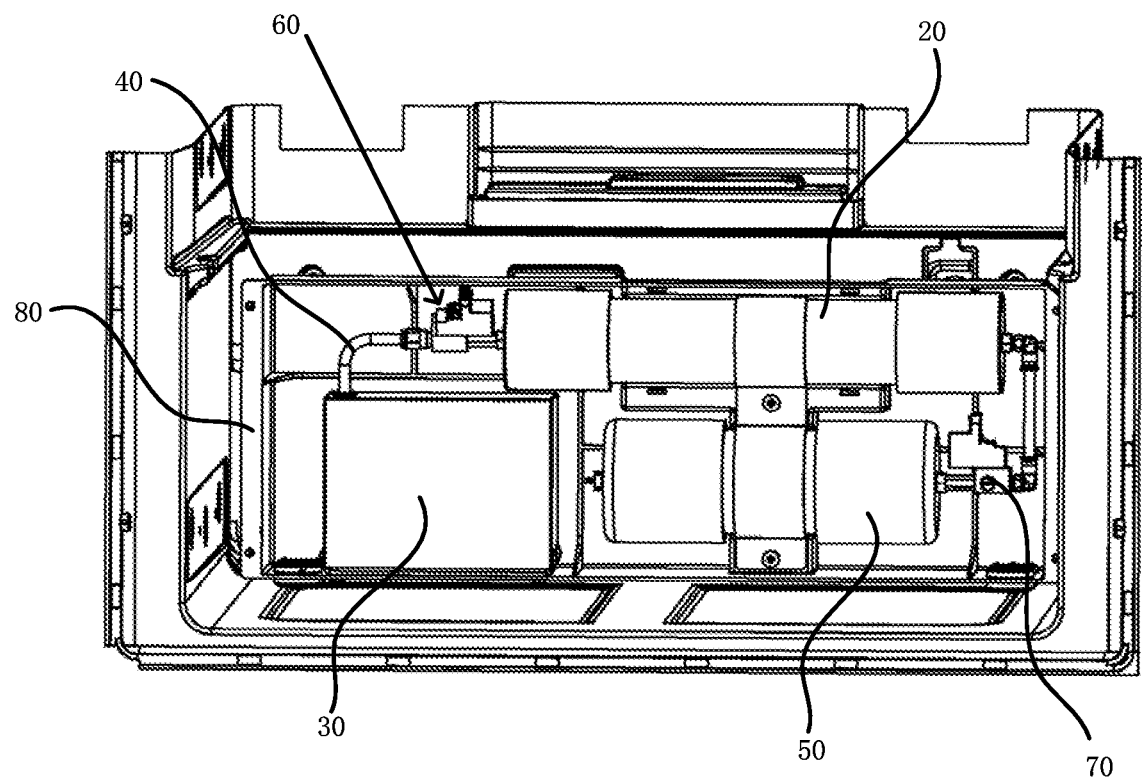
FIG. 3 is a schematic view of the interior of a storage compartment of a refrigerator according to another embodiment of the present invention.

FIG. 3 is a schematic view of the interior of a storage compartment of a refrigerator according to another embodiment of the present invention. In this embodiment, the refrigerator further comprises a nitrogen generation box 80 (of which a front panel that shields an internal part is not shown). The nitrogen generation box 80 is disposed in the storage compartment and clings to an inner wall of the refrigerator body 10. An accommodating cavity is defined in the nitrogen generation box 80 to accommodate the adsorption container 20, the air compressor 30 and the nitrogen storage tank 50. According to the refrigerator provided by the embodiment, the adsorption container 20, the air compressor 30, the nitrogen storage tank 50 and relevant pipelines are integrated into the nitrogen generation box 80, and therefore, the whole device may be integrally assembled and disassembled to facilitate inspection and maintenance.

Figure 4:
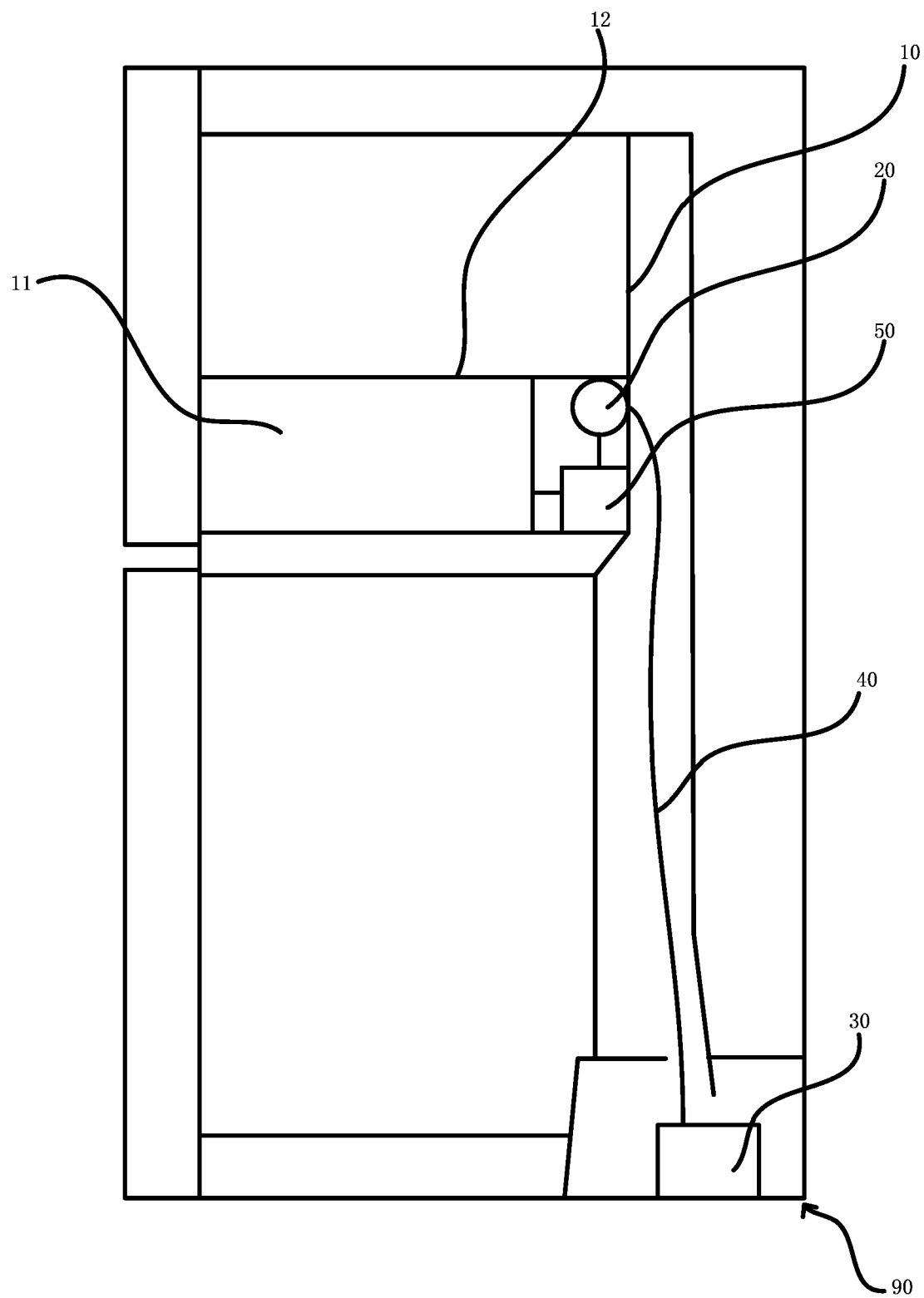
FIG. 4 is a schematic view of a refrigerator according to yet another embodiment of the present invention.

FIG. 4 is a schematic view of a refrigerator according to yet another embodiment of the present invention. The refrigerator may be an air-cooled refrigerator. The air compressor 30 is disposed in a compressor room 90 of the refrigerator and configured to suck air from the interior of the compressor room and to compress the sucked air, to supply the compressed air for the adsorption container 20. At least part of the air inlet pipe 40 extends along an air passage of the refrigerator and leads to the adsorption container 20. Air enters the air compressor 30 from the compressor room 90 to be compressed, and therefore, is at a relatively high temperature. If the high-temperature air is utilized to directly generate nitrogen, the nitrogen with a relatively higher temperature may be generated. The temperature may fluctuate greatly when the high-temperature nitrogen is input into the storage space 11, which adversely affects freshness preservation of food. In the embodiment, the air inlet pipe 40 is preferably connected to the adsorption container 20 in the storage compartment through an air passage of the refrigerator. When passing through the air passage of the refrigerator, high-temperature air is cooled down by cold air in the air passage, and then enters the adsorption container 20, so that the generated nitrogen is at a relatively lower temperature, and may not cause a great temperature fluctuation when input into the storage space 11, contributing to freshness preservation of food.

The refrigerator provided by the embodiment further comprises a partition plate 12 disposed in the refrigerator body 10 and configured to divide the storage compartment into a plurality of storage areas. The storage space 11 is disposed in one of the storage areas. The adsorption container 20 and the nitrogen storage tank 50 are disposed in the same storage area as the storage space 11 to conveniently provide nitrogen for the storage space 11. In the embodiment, the storage space 11, the adsorption container 20 and the nitrogen storage tank 50 are preferably disposed in the storage area at the lower part of the storage compartment. The adsorption container 20 may cling to a corner formed by an inner wall of the refrigerator body 10 and the partition plate, such that the use space in the storage compartment is saved. In some alternative embodiments, the adsorption container 20 may also be clung to a corner formed in the refrigerator body 10.

In the embodiment, the air compressor 30 is configured to be started at intervals during preparation of nitrogen to provide the compressed air for the adsorption container 20. The adsorption container 20 is further configured to be communicated with an external environment of the adsorption container 20 at pause time of the air compressor 30 to discharge an oxygen-enriched gas desorbed by the carbon molecular sieves to the external environment. The refrigerator provided by the embodiment particularly follows the following nitrogen generation principle: the air compressor 30 is started at intervals to provide the compressed air for the adsorption container 20, the air pressure in the adsorption container 20 rises when the air compressor is started, the carbon molecular sieves adsorb oxygen in the air, the remained nitrogen is input into the nitrogen storage tank 50, and the nitrogen storage tank 50 charges nitrogen into the storage space 11; and when the air compressor 30 pauses, the compressor air is no longer supplied for the adsorption container 20; meanwhile, the adsorption container 20 is communicated with the external environment, the air pressure in the adsorption container 20 is reduced, the carbon molecular sieves start to desorb, and a desorbed oxygen-enriched gas is discharged through an opening communicated with the outside.

Figure 5:
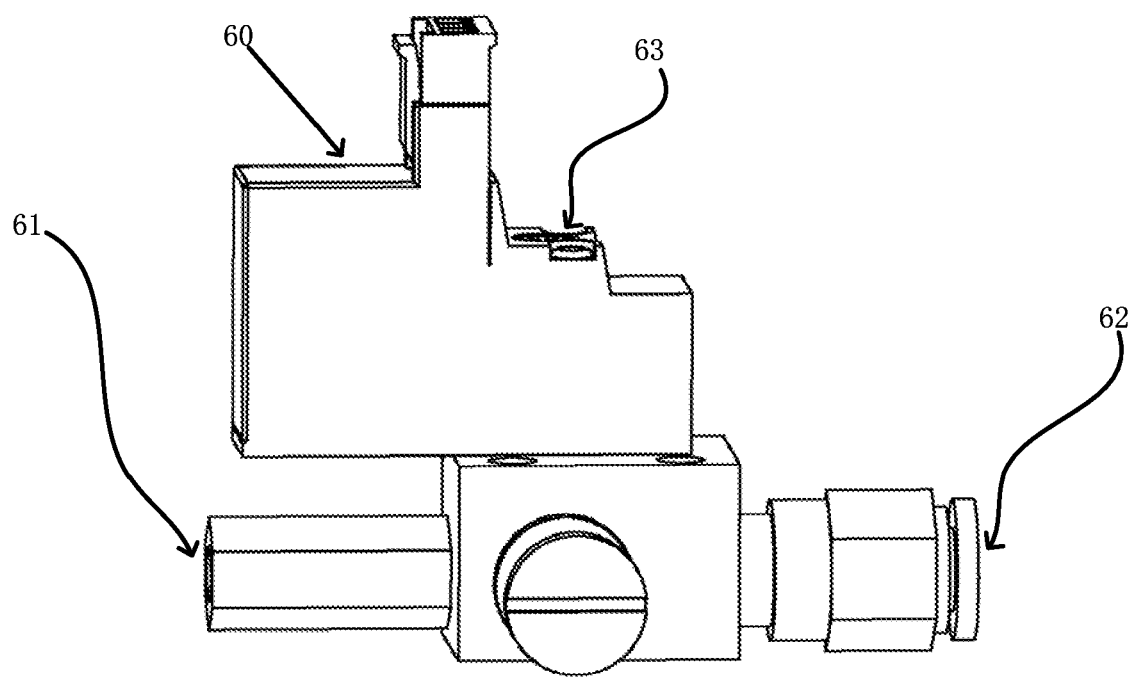
FIG. 5 is a schematic view of a three-way solenoid valve of a refrigerator according to yet another embodiment of the present invention.

The refrigerator of the embodiment further comprises a three-way solenoid valve 60. FIG. 5 is a schematic view of the three-way valve 60 of the refrigerator according to yet another embodiment of the present invention. The three-way solenoid valve 60 is disposed on the air inlet pipe 40 and provided with three gas delivery ports. A first gas delivery port 61 is communicated with the air compressor 30. A second gas delivery port 62 is communicated with the adsorption container 20. A third gas delivery port 63 is communicated with the external environment. The three-way solenoid valve 60 is configured to communicate the first gas delivery port 61 and the second gas delivery port 62 so as to allow the air compressor 30 to supply the compressed air for the adsorption container 20, and is further configured to close the first gas delivery port 61 and to communicate the second gas delivery port 62 with the third gas delivery port 63 at pause time of the air compressor 30 so as to discharge the oxygen-enriched gas desorbed by the adsorption container 20 to the external environment through the third gas delivery port 63. The third gas delivery port 63 may be communicated with the outside of the refrigerator to discharge the oxygen-enriched gas from the interior of the refrigerator, and may also be communicated with other storage spaces 11, which require the oxygen-enriched gas, in the refrigerator to utilize a discharge gas.

The refrigerator of the embodiment further comprises a two-way solenoid valve 70 disposed on a connecting pipeline between the adsorption container 20 and the nitrogen storage tank 50 and configured to disconnect the connecting pipeline between the adsorption container 20 and the nitrogen storage tank 50 at pause time of the air compressor 30 to prevent nitrogen from backflow.

The refrigerator of the embodiment further comprises a flow regulation valve disposed on a pipeline, leading to the storage space 11, of the nitrogen storage tank 50 and configured to regulate gas output flow of the nitrogen storage tank 50.

Figure 6:
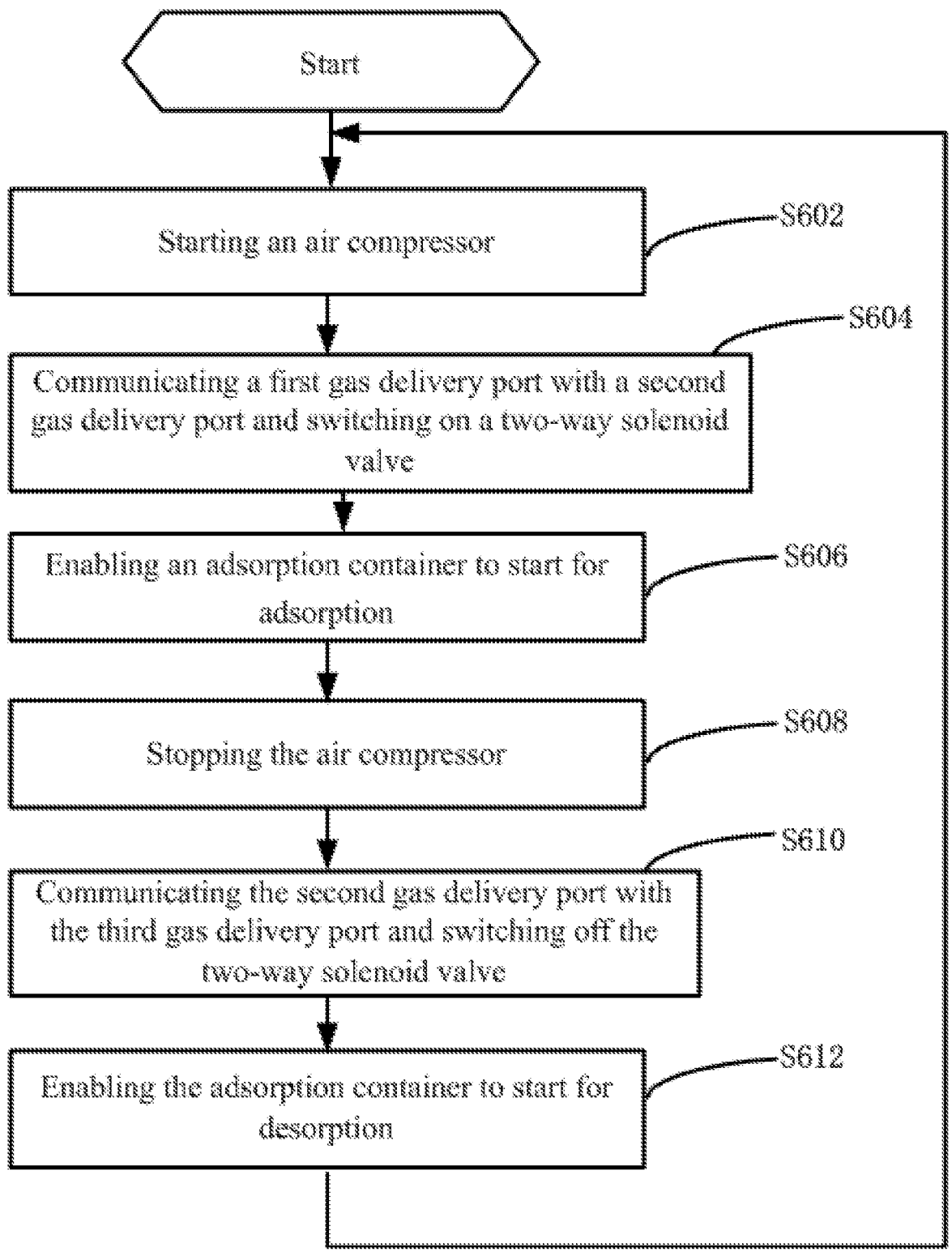
FIG. 6 is a flow chart of a control method of a refrigerator according to yet another embodiment of the present invention.

FIG. 6 is a flow chart of a control method of a refrigerator according to yet another embodiment of the present invention. The control method sequentially comprises the following steps.

Step S602 includes starting an air compressor 30 to compress the sucked air.

Step S604 includes communicating a first gas delivery port 61 with a second gas delivery port 62, switching on a two-way solenoid valve 70, and providing compressed air for an adsorption container 20 by means of the air compressor 30 to increase the air pressure in the adsorption container 20.

Step S606 includes enabling the adsorption container 20 to start for adsorption, adsorbing oxygen in air by means of carbon molecular sieves in the adsorption container 20, and conveying the remained nitrogen to a nitrogen storage tank 50. In this embodiment, the adsorption process may last for 30 s to 2 min, preferably 50 s.

Step S608 includes stopping the air compressor 30.

Step S610 includes communicating the second gas delivery port 62 with a third gas delivery port 63, switching off the two-way solenoid valve 70, and stopping the air compressor 30 providing the compressed air for the adsorption container 20 to reduce the air pressure in the adsorption container 20.

Step S612 includes enabling the adsorption container 20 to start for desorption, desorbing adsorbed oxygen by means of the carbon molecular sieves in the adsorption container 20, and discharging the desorbed oxygen out of the adsorption container 20 through the third gas delivery port 63. In the embodiment, the desorption process may last for 30 s to 2 min, preferably 50 s.

The following process repeats the above-mentioned cycle. The air compressor 30 provides the compressed air for the adsorption container 20 at intervals. The adsorption container 20 alternatively performs adsorption and desorption to generate nitrogen at intervals. The generated nitrogen is provided for the nitrogen storage tank 50.

The embodiment provides the refrigerator, which comprises the adsorption container 20, the air compressor 30 and the nitrogen storage tank 50. The sealed storage space 11 is formed in the storage compartment of the refrigerator. The adsorption container 20 with the carbon molecular sieves disposed therein is disposed in the storage compartment. The air compressor 30 is directly connected to the adsorption container 20 through the air inlet pipe 40 and configured to supply compressed air for the adsorption container 20 in a controlled manner so as to allow the carbon molecular sieves to prepare nitrogen by means of the compressed air. The nitrogen storage tank 50 is adjacent to the adsorption container 20. The gas inlet end of the nitrogen storage tank 50 is connected to the adsorption container 20 to receive nitrogen prepared by the carbon molecular sieves, and the gas outlet end thereof is communicated with the storage space 11 to provide the nitrogen therefor. According to the refrigerator, as the storage space 11 for keeping food fresh is formed in the storage compartment, the adsorption container 20 is configured to prepare the nitrogen, and the nitrogen storage tank 50 supplies the prepared nitrogen for the storage space 11, the content of oxygen in the storage space 11 is reduced. Thus, the freshness preservation performance of the refrigerator is improved.

According to the refrigerator of the embodiment, through a miniaturization design of a nitrogen preparation system, at least the adsorption container 20 and the nitrogen storage tank 50 are placed in the storage compartment, facilitating supply of nitrogen for the storage space 11. In addition, as the nitrogen storage tank 50 is adjacent to the adsorption container 20, the refrigerator has a compact internal structure, and the use space of the refrigerator is saved.

Further, the air compressor 30 is disposed in the storage compartment and adjacent to the adsorption container 20, sucks air from the interior of the storage compartment, compresses the sucked air and supplies the compressed air for the adsorption container 20. As the air compressor 30 and the adsorption container 20 are disposed in the storage compartment, the structure of the refrigerator is compact and the use space thereof is saved.

So far, those skilled in the art should realize that although the present description illustrates and describes various exemplary embodiments of the present invention, many other modifications or amendments conforming to the principle of the present invention can be determined directly or derived based on the content disclosed by the present invention without departing from the spirit and scope of the present invention. Therefore, the scope of the present invention should be understood and considered to have covered all these modifications or amendments.

What is claimed is:

1. A refrigerator, comprising:
  a refrigerator body in which a storage compartment is defined, a sealed storage space being formed in the storage compartment;
  an adsorption container disposed in the storage compartment, carbon molecular sieves being disposed in the adsorption container;
  an air compressor directly connected to the adsorption container through an air inlet pipe and configured to supply compressed air for the adsorption container in a controlled manner so as to allow the carbon molecular sieves to prepare nitrogen by means of the compressed air; and
  a nitrogen storage tank which is adjacent to the adsorption container and a gas inlet end of which is connected to the adsorption container to receive nitrogen prepared by the carbon molecular sieves and a gas outlet end of which is communicated with the storage space to provide the prepared nitrogen;

wherein the air compressor is disposed in a compressor room of the refrigerator and configured to suck air from the interior of the compressor room and to compress the sucked air to supply the compressed air for the adsorption container;

wherein the refrigerator further comprises a partition plate disposed in the refrigerator body to divide the storage compartment, and wherein the adsorption container clings to a corner formed by the inner wall of the refrigerator body and the partition plate.

2. The refrigerator according to claim 1, wherein:
the air compressor is disposed in the storage compartment and adjacent to the adsorption container; the air compressor is configured to suck air from the interior of the storage compartment and to compress the sucked air to supply the compressed air for the adsorption container.

3. The refrigerator according to claim 2, further comprising:
a nitrogen generation box disposed in the storage compartment and clung to an inner wall of the refrigerator body, and an accommodating cavity being defined in the nitrogen generation box to accommodate the adsorption container, the air compressor and the nitrogen storage tank.

4. The refrigerator according to claim 1, wherein:
at least part of the air inlet pipe extends along an air passage of the refrigerator and leads to the adsorption container.

5. The refrigerator according to claim 1, wherein:
the air compressor is configured to be started at intervals during preparation of nitrogen to provide the compressed air for the adsorption container; and
the adsorption container is further configured to be communicated with an external environment of the adsorption container at a pause time of the air compressor to discharge an oxygen-enriched gas desorbed by the carbon molecular sieves to the external environment.

6. The refrigerator according to claim 5, further comprising:
a three-way solenoid valve disposed on the air inlet pipe and provided with three gas delivery ports, wherein a first gas delivery port is communicated with the air compressor, a second gas delivery port is communicated with the adsorption container, and a third gas delivery port is communicated with the external environment;
the three-way solenoid valve is configured to communicate the first gas delivery port with the second gas delivery port so as to allow the air compressor to supply the compressed air for the adsorption container, and is further configured to close the first gas delivery port and to communicate the second gas delivery port with the third gas delivery port at the pause time of the air compressor so as to discharge the oxygen-enriched gas desorbed by the adsorption container to the external environment through the third gas delivery port.

7. The refrigerator according to claim 5, further comprising:
a two-way solenoid valve disposed on a connecting pipeline between the adsorption container and the nitrogen storage tank and configured to disconnect the connecting pipeline between the adsorption container and the nitrogen storage tank at the pause time of the air compressor to prevent nitrogen from backflow.

8. The refrigerator according to claim 1, further comprising:
a flow regulation valve disposed on a pipeline, leading to the storage space, of the nitrogen storage tank and configured to regulate the gas output flow of the nitrogen storage tank.

9. A refrigerator, comprising:
a refrigerator body in which a storage compartment is defined, a sealed storage space being formed in the storage compartment;
an adsorption container disposed in the storage compartment, carbon molecular sieves being disposed in the adsorption container;
an air compressor directly connected to the adsorption container through an air inlet pipe and configured to supply compressed air for the adsorption container in a controlled manner so as to allow the carbon molecular sieves to prepare nitrogen by means of the compressed air; and
a nitrogen storage tank which is adjacent to the adsorption container and a gas inlet end of which is connected to the adsorption container to receive nitrogen prepared by the carbon molecular sieves and a gas outlet end of which is communicated with the storage space to provide the prepared nitrogen;
wherein the air compressor is configured to be started at intervals during preparation of nitrogen to provide the compressed air for the adsorption container; and
the adsorption container is further configured to be communicated with an external environment of the adsorption container at a pause time of the air compressor to discharge an oxygen-enriched gas desorbed by the carbon molecular sieves to the external environment;
wherein the refrigerator further comprises:
a three-way solenoid valve disposed on the air inlet pipe and provided with three gas delivery ports, wherein a first gas delivery port is communicated with the air compressor, a second gas delivery port is communicated with the adsorption container, and a third gas delivery port is communicated with the external environment;
the three-way solenoid valve is configured to communicate the first gas delivery port with the second gas delivery port so as to allow the air compressor to supply the compressed air for the adsorption container, and is further configured to close the first gas delivery port and to communicate the second gas delivery port with the third gas delivery port at the pause time of the air compressor so as to discharge the oxygen-enriched gas desorbed by the adsorption container to the external environment through the third gas delivery port.

\* \* \* \* \*